(12) United States Patent
Hu et al.

(10) Patent No.: US 11,169,648 B2
(45) Date of Patent: Nov. 9, 2021

(54) TOUCH ELECTRODE, TOUCH DISPLAY PANEL, AND TOUCH DISPLAY DEVICE

(71) Applicants: Chengdu BOE Optoelectronics Technology Co., Ltd., Sichuan (CN); BOE Technology Group Co., Ltd., Beijing (CN)

(72) Inventors: Xuwu Hu, Beijing (CN); Yangsheng Liu, Beijing (CN); Wei Lin, Beijing (CN); Xingjiang Liang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/924,431

(22) Filed: Jul. 9, 2020

(65) Prior Publication Data
US 2021/0191569 A1 Jun. 24, 2021

(30) Foreign Application Priority Data
Dec. 20, 2019 (CN) .......................... 201911326016.0

(51) Int. Cl.
*G06F 3/044* (2006.01)
(52) U.S. Cl.
CPC .. *G06F 3/0446* (2019.05); *G06F 2203/04111* (2013.01); *G06F 2203/04112* (2013.01)

(58) Field of Classification Search
CPC ......... G06F 3/0446; G06F 2203/04112; G06F 2203/04111
See application file for complete search history.

(56) References Cited

U.S. PATENT DOCUMENTS

| | | | |
|---|---|---|---|
| 2013/0207911 A1* | 8/2013 | Barton | G06F 3/044 345/173 |
| 2015/0177872 A1* | 6/2015 | Kim | G06F 3/04166 345/174 |
| 2018/0059843 A1* | 3/2018 | Kim | G06F 3/0446 |
| 2019/0129568 A1* | 5/2019 | Sakamoto | G06F 3/0445 |

* cited by examiner

*Primary Examiner* — Deeprose Subedi
(74) *Attorney, Agent, or Firm* — Westerman, Hattori, Daniels & Adrian, LLP

(57) ABSTRACT

A touch electrode, a touch display panel, and a touch display device are provided in embodiments of the present disclosure. The touch electrode includes a plurality of touch electrode groups, the plurality of touch electrode groups is arranged to extend linearly along a same extending direction and parallel to one another in a direction orthogonal to the extending direction, each touch electrode group includes a plurality of touch sub-electrodes arranged in series along the extending direction; each touch sub-electrode has a plurality of first conductive wires located therein, and a plurality of second conductive wires extending outward from an edge thereof, and respective second conductive wires of the plurality of touch sub-electrodes in each touch electrode group are at least partially connected with one another.

18 Claims, 6 Drawing Sheets

TOUCH ELECTRODE, TOUCH DISPLAY PANEL, AND TOUCH DISPLAY DEVICE

CROSS-REFERENCE TO RELATED APPLICATION

The present disclosure claims the benefit of Chinese Patent Application No. 201911326016.0 filed on Dec. 20, 2019 in the National Intellectual Property Administration of China, the whole disclosure of which is incorporated herein by reference.

TECHNICAL FIELD

Embodiments of the present disclosure relate to the field of display technology, and in particular, to a touch electrode, a touch display panel, and a touch display device.

BACKGROUND

In flexible display devices, especially for flexible display screens used for foldable mobile phones or tablet computer products, creases generated when the flexible display screens are folded along respective bending axes will affect the aesthetics of these flexible display screens. When a flexible display is restored from a bent state to a flattened state, then, due to the existence of residual stress and strain, there are redundant local ridges or recesses that cannot be restored to the flattened state in time or sufficiently at or near the creases. The creases appear repeatedly as the number of folds increases so as to incur fatigue of the display screen at and near the creases. Therefore, usually, it is necessary to reduce a folding radius around the bending axis as much as possible; in other words, to reduce the area occupied by the creases and the vicinity of the creases, thereby minimizing the scope of the local area affected by the deflection/flexure upon folding as much as possible.

SUMMARY

The embodiments of the present disclosure have been made to overcome or alleviate at least one aspect of the above mentioned defects and/or deficiencies in the relevant art, by providing a touch electrode, a touch display panel, and a touch display device.

Following technical solutions are provided in exemplary embodiments of the disclosure.

According to an aspect of embodiments of the disclosure, there is provided a touch electrode, comprising: a plurality of touch electrode groups, the plurality of touch electrode groups being arranged to extend linearly along a same extending direction and parallel to one another in a direction orthogonal to the extending direction, and each touch electrode group comprising a plurality of touch sub-electrodes arranged in series along the extending direction; each touch sub-electrode is provided with a plurality of first conductive wires located therein, and a plurality of second conductive wires extending outward from an edge thereof, and respective second conductive wires of the plurality of touch sub-electrodes in each touch electrode group are at least partially connected with one another; and at least part of the plurality of first conductive wires and the plurality of second conductive wires are respectively formed with broken wire ends which are provided with respective periods smaller than that of the touch sub-electrodes in each touch electrode group, and broken wire identification portions are formed at or near the broken wire ends, respectively, and each of the broken wire identification portions is set to have a cross section thereof which has a shape different from a cross sections of each of the first conductive wires or each of the second conductive wires, or is set to have a line width thereof larger than that a line width of each of the first conductive wires or each of the second conductive wires, or positions of the broken wire identification portions are determined to be spaced apart from the broken wire ends.

In an exemplary embodiment, each touch sub-electrode comprises a plurality of effective electrode patterns and a plurality of dummy electrode patterns, and the plurality of first conductive wires in each touch sub-electrode comprise effective conductive wire portions arranged in the plurality of effective electrode patterns and dummy conductive wire portions arranged in the plurality of dummy electrode patterns, and respective broken wire identification portions are formed at or near respective broken wire ends of part of the plurality of first conductive wires located in the effective conductive wire portions.

In an exemplary embodiment, the plurality of effective electrode patterns are connected with one another, and the plurality of dummy electrode patterns are arranged to be surrounded by the plurality of effective electrode patterns and spaced apart from one another, respectively.

In an exemplary embodiment, the plurality of dummy electrode patterns are respectively in the form of blocks.

In an exemplary embodiment, at least one broken wire identification portion is located on an extension line of respective at least one first conductive wire or respective at least one second conductive wire where respective at least one broken wire end is located.

In an exemplary embodiment, at least one broken wire identification portion is in contact with respective at least one first conductive wire or respective at least one second conductive wire where respective at least one broken wire end is located, by abutting against the respective at least one broken wire end, and spans across a distance in a width direction of the respective at least one first conductive wire or the respective at least one second conductive wire, which distance is larger than a width of the respective at least one first conductive wire or the respective at least one second conductive wire.

In an exemplary embodiment, at least one broken wire identification portion is arranged to be separated from respective at least one first conductive wire or respective at least one second conductive wire where respective at least one broken wire end is located.

In an exemplary embodiment, at least one broken wire identification portion is located on at least one side of respective at least one first conductive wire or respective at least one second conductive wire where respective at least one broken wire end is located.

In an exemplary embodiment, two broken wire ends are adjacent to each other and located in an extending direction of a same conductive wire, each of respective two broken wire identification portions is located on a single side of respective first conductive wire or respective second conductive wire where the two broken wire ends are located respectively, and the respective two broken wire identification portions are respectively located on a same side.

In an exemplary embodiment, two broken wire ends are adjacent to each other and located in an extending direction of a same conductive wire, each of respective two broken wire identification portions is located on a single side of respective first conductive wire or respective second conductive wire where the two broken wire ends are located respectively, and the respective two broken wire identification portions are respectively located on different sides.

In an exemplary embodiment, wo broken wire ends are adjacent to each other and located in an extending direction of a same conductive wire, each of respective two broken wire identification portions is located on both sides of respective first conductive wire or respective second conductive wire where the two broken wire ends are located respectively.

In an exemplary embodiment, two broken wire ends are adjacent to each other and located in an extending direction of a same conductive wire, one broken wire identification portion is provided at or near one of the two broken wire ends.

In an exemplary embodiment, each of the broken wire identification portions is shaped in the form of a circle shape, a triangle shape, a rectangle shape, a diamond shape, a pentacle shape, a pentagon shape, or a hexagon shape.

In an exemplary embodiment, a width of each of the first and second conductive wires is about 3 microns to 4 microns; and each of the broken wire identification portions is shaped in the form of a circle, and a diameter of each of the broken wire identification portions is greater than or equal to about 5 microns.

In an exemplary embodiment, a material of the broken wire identification portions is the same as a material of the first conductive wires and the second conductive wires.

In an exemplary embodiment, each touch sub-electrode is in the form of a quadrangular shape; and a length of a diagonal line of each touch sub-electrode is about 4 mm to 5 mm.

According to another aspect of embodiments of the disclosure, there is provided a touch display panel comprises a display area, wherein the display area comprises: a first electrode comprising the touch electrode according to claim 1, arranged such that the extending direction of each touch electrode group in the first electrode is along a first direction; a second electrode comprising the touch electrode according to claim 1, arranged such that the extending direction of each touch electrode group in the second electrode is along a second direction orthogonal to the first direction; the first electrode and the second electrode are alternately arranged along the first direction and the second direction in a manner that orthographic projections of the first electrode and the second electrode on the touch display panel do not overlap with each other.

According to still another aspect of embodiments of the disclosure, there is provided a touch display device, comprising the touch display panel as above.

It should be understood that, both above general depictions and following detailed depictions are merely exemplary and illustrative, rather than limiting the embodiments of the disclosure.

BRIEF DESCRIPTION OF THE DRAWINGS

In order to more clearly explain the technical solutions of the embodiments of the present disclosure, the drawings required to be used in the description of the embodiments of the present disclosure will be briefly introduced hereinafter. It is apparent that, the drawings in the following description are merely some embodiments of the present disclosure. For those skilled in the art, without paying any creative work, other drawings can be obtained based on these drawings. The drawings are used to provide a further understanding of the technical solutions of the embodiments of the present disclosure, and constitute a part of the specification. They are used to explain the technical solutions of the embodiments of the present disclosure with reference to the embodiments of the present application, and do not constitute limitations on the technical solutions of the embodiments of the present disclosure, in the drawings.

DETAILED DESCRIPTION OF EMBODIMENTS

Figure 1A:
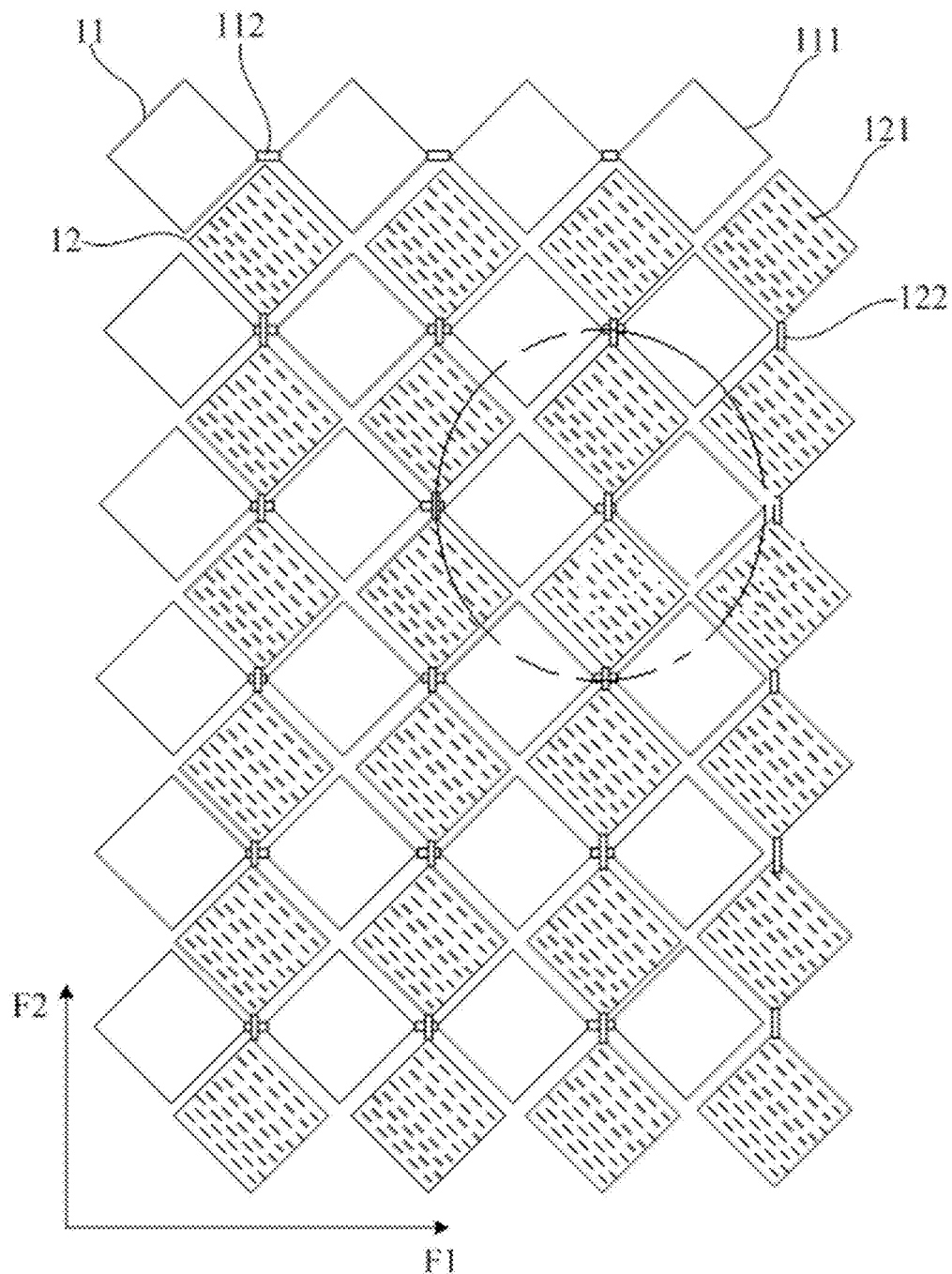
FIG. 1(a) is a schematic structural view of a touch display panel.

To make objectives, technical solutions, and advantages of embodiments of the present disclosure more clear, technical solutions of the embodiments of the present disclosure will be described clearly and completely with reference to the drawings of the embodiments of the present disclosure. It is apparent that, the embodiments as described are part of the embodiments of the present disclosure, rather than all of them. Based on the described embodiments of the present disclosure, all other embodiments which are obtained by those skilled in the art without creative efforts fall within the protection scope of the embodiments of the present disclosure.

The embodiments of the present application are described in detail hereinafter. Exemplary embodiments are shown in the drawings, in which the same or similar reference numerals denote the same or similar elements or elements having the same or similar functions. The embodiments described below with reference to the drawings are exemplary, and are merely used to explain the present application, rather than being construed as a limitation of the present application. For clarity, various parts in the drawings are not drawn to scale. In addition, some well-known parts may not be shown in the drawings.

In the following, many specific details of the embodiments of the present disclosure are described, such as the structures, materials, dimensions, treatment processes and techniques, so as to understand the embodiments of the present disclosure more clearly. However, as can be understood by those skilled in the art, the embodiments of the present disclosure may not be implemented according to these specific details.

Respective dimensions and shapes of various components in the drawings are merely intended to exemplarily illustrate the contents of embodiments of the disclosure, rather than to demonstrate true proportions of the components of the touch electrode, the touch display panel, and the touch display device of the embodiments of the present disclosure.

In the relevant art, in order to reduce the folding radius of the flexible display device e.g., the folding display screen) at and near the crease, for example, a FMLOC (Flexible Multi-Layer On Cell) process is used for TSP (Touch Screen Panel). Specifically, transmitting electrodes and receiving electrodes are made on an encapsulation layer of the display panel, and are respectively metal meshes for performing touch control, which realizes an integrated TSP which is integral with the display panel, rather than using an external TSP. As such, the process reduces the thickness of the touch display device, which facilitates the folding of the touch display device. There is no fitting tolerance, and the width of the frame or bezel may be reduced.

However, there are many broken wire ends in the metal meshes of the transmitting electrodes and the receiving electrode made by the above-mentioned FMLOC process, and the presence of the broken wire ends will introduce interference when an engineer inspects to determine the existence and location of defect status such as the short circuit, open circuit and the like.

FIG. 1(a) shows, in a top view, a schematic structural view of a layer of a touch display panel in which layer touch electrodes are located, with a distribution of patterns of two types of touch electrodes being schematically shown.

As shown in FIG. 1(a), the touch display panels provided in the relevant art and the examples of the present disclosure comprise, for example, a display area (also referred to as Active Area, i.e., abbreviated as 'AA"). As shown in FIG. 1(a), the display area comprises two types of touch electrodes, i.e., a first touch electrode 11 and a second touch electrode 12, each of the first touch electrode 11 and the second touch electrode 12 comprises, for example, multiple touch electrode groups. For example, by taking the first touch electrode 11 as an example, as shown in the figure, the first touch electrode 11 comprises multiple touch electrode groups; specifically, the multiple touch electrode groups of the first touch electrode 11 are, for example, multiple rows, which extend along a first direction labeled by 'F1', in the first touch electrode 11 as shown in FIG. 1(a), hereinafter referred to as a plurality of first touch electrode groups. The plurality of first touch electrode groups are arranged to extend linearly along a same extension direction (e.g., the first direction F1 shown in FIG. 1(a)) and are parallel to each other or one another in a direction (e.g., a second direction F2 shown in FIG. 1(a)) orthogonal to the extension direction thereof, and each first touch electrode group comprises a plurality of touch sub-electrodes 111 arranged in series (more specifically, electrically connected in series) along the extension direction F1, hereinafter referred to as a plurality of first touch sub-electrodes 111. Similarly, by taking the second touch electrode 12 as an example, as shown in the figure, the second touch electrode 12 also comprises multiple touch electrode groups; specifically, the multiple touch electrode groups of the second touch electrode 12 are, for example, multiple columns, which extend along the second direction F2, in the second touch electrodes 12 as shown in FIG. 1(a), hereinafter referred to as a plurality of second touch electrode groups. The plurality of second touch electrode groups are arranged to extend linearly along a same extension direction (e.g., the second direction F2 shown in FIG. 1(a)) and are parallel to each other or one another in a direction (e.g., the first direction F1 shown in FIG. 1(a)) orthogonal to the extension direction thereof, and each second touch electrode group comprises a plurality of touch sub-electrodes 112 arranged in series (more specifically, electrically connected in series) along the extending direction F2, hereinafter referred to as a plurality of second touch sub-electrodes 112. The first touch sub-electrodes and the second touch sub-electrodes are alternately arranged in each of the first direction F1 and the second direction F2. More specifically, for example, one type of the first touch electrode 11 and the second touch electrode 12 may be touch scanning electrodes, that is, touch driving electrodes; and the other type may be touch sensing electrodes. Accordingly, one type of the first touch sub-electrodes and the second touch sub-electrodes may be touch scanning sub-electrodes, that is, touch driving sub-electrodes, and the other type may be touch sensing sub-electrodes.

In the relevant art and specific examples of the present disclosure, as shown in FIG. 1(a), each first touch electrode group in the first touch electrode 11 (that is, each row of the first touch electrode 11, as illustrated) comprises, for example, a plurality of first touch sub-electrodes 111 in the form of electrode blocks and a plurality of first connection portions 112 (i.e., conductive connection portions here) in the form of strips. And in each first touch electrode group, one first touch sub-electrode 111 and another first touch sub-electrode 111 adjacent thereto are electrically connected with each other through a respective one first connection portion 112 between both of them, that is, two adjacent first touch sub-electrodes 111 in each first touch electrode group are electrically connected with each other by a respective first connection portion 112 interposed therebetween.

In the relevant art and further examples of the present disclosure, each of the first touch sub-electrodes 111 in the first touch electrode 11 is, for example, quadrangular. In a more specific example, each first touch sub-electrode 111 is, for example, diamond-shaped. Wherein, a length of a diagonal of each first touch sub-electrode 111 (for example, along each of the first direction F1 and the second direction F2, as illustrated) is 4 mm to 5 mm. In this example, the length of the diagonal of each first touch sub-electrode 111 is 4 mm. In another example, the length of the diagonal of each first touch sub-electrode 111 is 5 mm. In still another example, the length of the diagonal of each first touch sub-electrode 111 is 4.5 mm.

In the relevant art and specific examples of the present disclosure, as shown in FIG. 1(a), each second touch electrode group in the second touch electrodes 12 (that is, each column of the second touch electrode 12 as illustrated) comprises, for example, a plurality of second touch sub-electrodes 121 in the form of electrode blocks and a plurality of second connection portions 122 (i.e., conductive connection portions here) in the form of strips. And in each second touch electrode group, one second touch sub-electrode 121 and another second touch sub-electrode 121 adjacent thereto are electrically connected with each other through a respective one second connecting portion 122 located between both of them, that is, two adjacent second touch sub-electrodes 121 in each second touch electrode group are electrically connected with each other by a respective second connection portion 122 interposed therebetween.

In the relevant art and further examples of the present disclosure, each second touch sub-electrode 121 in the second touch electrode 12 is, for example, a quadrilateral. In a more specific example, each second touch sub-electrode 121 is, for example, diamond-shaped. Wherein, a length of the diagonal of each second touch sub-electrode 121 (for example, along each of the first direction F1 and the second direction F2, as illustrated) is 4 mm to 5 mm. In this example, the length of the diagonal of each second touch sub-electrode 121 is 4 mm. In another example, the length of the diagonal of each second touch sub-electrode 121 is 5 mm. In still another example, the length of the diagonal of each second touch sub-electrode 121 is 4.5 mm. To sum up, the length of the diagonal of the touch sub-electrode is, for example, about 4-5 mm. Wherein "about" means that at end points of such a value interval for width, the specific width value of conductive wire is actually equal to or slightly greater than or slightly smaller than the end point value, for example, an absolute value of the difference between a practical end point value and the nominal end point value is 0.1 microns.

As an example, in a case where the first connection portions 112 and the second connection portions 122 are overlapped respectively, the first connection portions 112 and the second connection portions 122 are insulated from each other, respectively.

As an example, the first touch sub-electrodes 111 and the first connection portions 112 in the first touch electrode 11, and the second touch sub-electrodes 121 in the second touch electrode 12, are located in a first metal layer; and the second connection portions 122 in the second touch electrode 12 are located in a second metal layer. The second connection portions 122 are, for example, metal bridges. In this example, the first touch sub-electrodes 111 in the first touch electrode 11, the second touch sub-electrodes 121 in the second touch electrode 12, the first connection portions 112 and the second connection portions 112 are prepared, for example, by using the FMLOC process. Wherein, conductive wires functioning as leading wires or connection portions (e.g., the first connection portions 112 and the second connection portions 122) respectively extending outward from the first touch sub-electrodes 111 and the second touch sub-electrodes 121 are also located in the first metal layer or the second metal layer, the leading wires are also for example, located in both the first metal layer and the second metal layer.

In this embodiment, the second touch electrodes 12 and the first touch electrodes 11 are similar in structure. In order to avoid content redundancy, the first touch electrodes 11 are taken as an example for detailed description below.

Figure 1B:
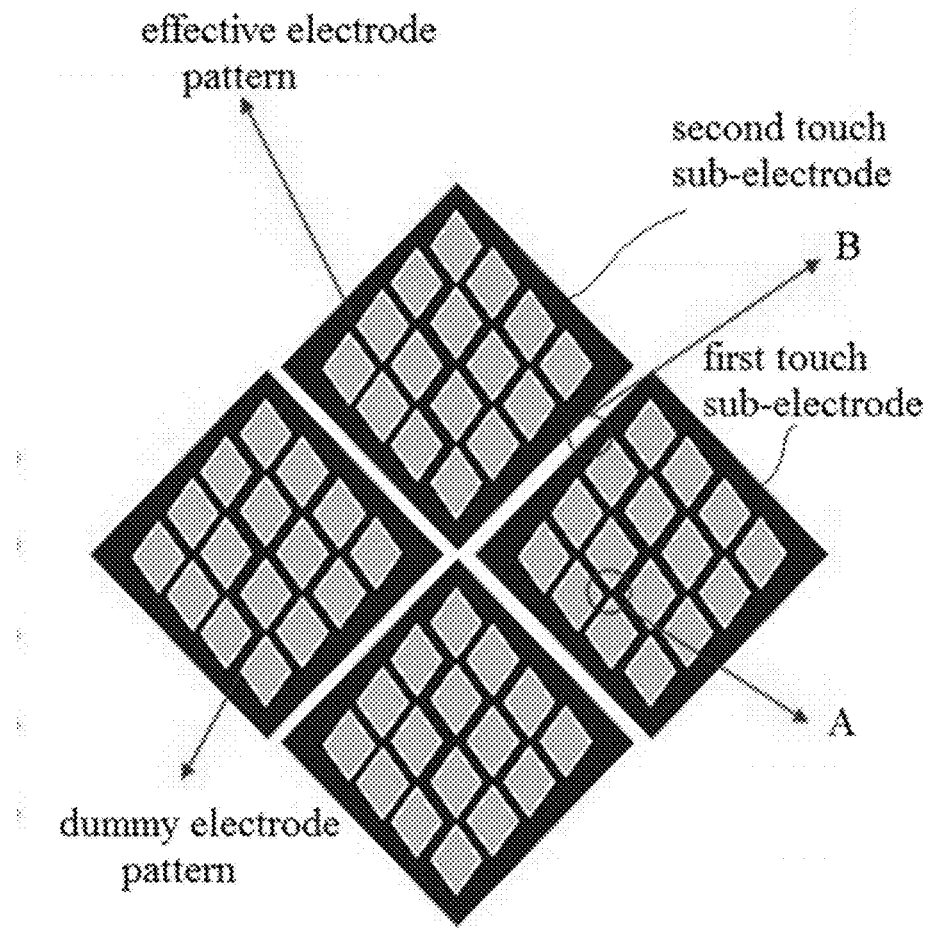
FIG. 1(b) shows, in a partially enlarged view, schematic electrode patterns in the circled part in FIG. 1(a), comprising touch electrode patterns and dummy electrode patterns.
Figure 2:
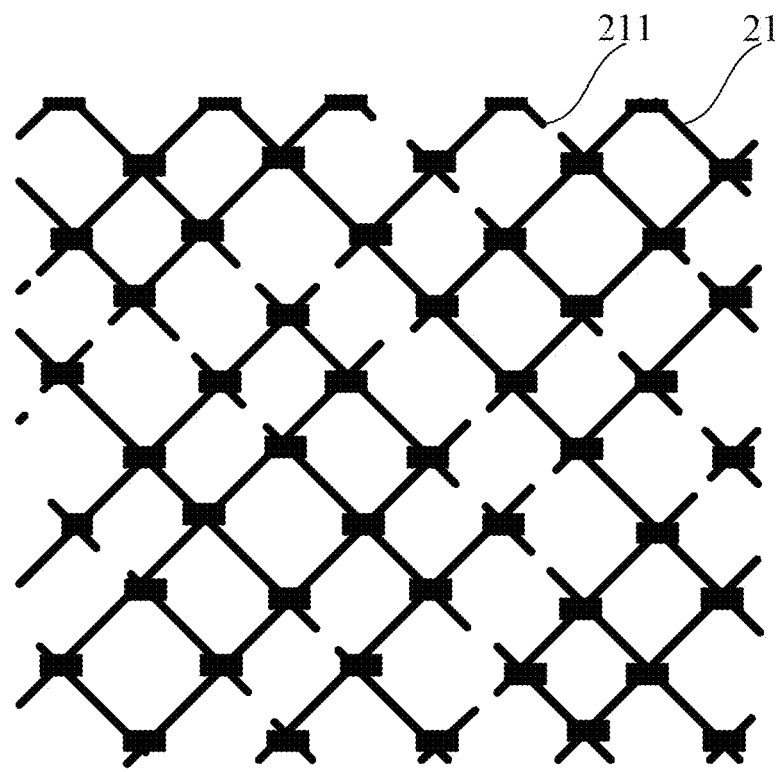
FIG. 2 shows, in a schematic partial enlarged view, a schematic structural view of some touch sub-electrodes arranged in a touch display panel as delimited in an ellipse A in FIG. 1(b) and viewed in a field of view of a single AOI.

For example, FIG. 1(b) shows, in a partially enlarged view, schematic electrode patterns in the circled part in FIG. 1(a), comprising touch electrode patterns and dummy electrode patterns. FIG. 2 further shows, in a schematic partial enlarged view, a schematic structural view of some touch sub-electrodes arranged in a touch display panel as delimited in an ellipse A in FIG. 1(b) and viewed in a field of view of a single AOI. It should be pointed out that, although the dummy electrode patterns and the touch electrode patterns shown in FIG. 1(b) are, for example, illustrated as blocks or strips, then, in essence, they are merely schematic. In essence, at least one type or both types of the dummy electrode pattern and the touch electrode pattern may be simplified, for example, to be in the form of a conductive wire mesh shown in FIG. 2 (that is, FIG. 2 schematically shows an electrical connection state in or near each touch sub-electrode).

In this example, FIG. 2 is a schematic partially enlarged view of a portion (mainly located at or near the dummy electrode patterns) shown in ellipse A in FIG. 1(b), as shown in FIG. 2, one type of the first touch electrodes 11 and the second touch electrodes 12 may comprise a plurality of conductive wires interlaced or intersected to define a conductive wire mesh, for example, each first touch sub-electrode 111 in the first touch electrode 11 comprises a plurality of conductive wires 21, which are interlaced or intersected to form a conductive wire mesh and are electrically connected to each other or one another. And, as shown in the figure, at least one conductive wire 21 is designed to be provided with a broken wire end 211. In this example, the material of the conductive wires 21 is, for example, metal. Therefore, the above-mentioned conductive wire mesh may be referred to as a metal mesh, which is prepared by, for example, printed electronic circuit technology, etching technology, or the like, but is not limited to the above preparation processes.

In this embodiment, as shown in FIG. 2, conductive wires 21 are also formed with broken wire ends 211. As an example, as shown in FIG. 1(b), in the display area, each of the first touch sub-electrodes 111 and the second touch sub-electrodes 112 comprises, for example, a respective touch electrode pattern and a respective dummy electrode pattern. For example, as shown in the figure, the touch electrode patterns of each of the first touch sub-electrodes and the second touch sub-electrodes are, for example, mesh-shaped and surround and space apart a plurality of dummy electrode patterns provided therein. Furthermore, in the interiors of the first touch electrodes 11 and the second touch electrodes 12, there are provided with some conductive wires which are broken off, i.e., disconnected, for example, for the purpose of shadows-elimination and electrical effects. Therefore, in the interiors of the first touch electrodes 11 and the second touch electrodes 12, there are also provided with broken wire ends 211. Specifically, for example, as shown in FIG. 2, on the one hand, respective leading wires or conductive wires of the touch scanning electrodes and the touch sensing electrodes need to be disconnected at intersections thereof; on the other hand, for example, for the purpose of refractive index matching, or in order to reduce parasitic capacitance(s) between or among touch electrodes (such as between or among touch sensing electrodes or between or among touch sensing sub-electrodes of a touch sensing electrode), it is also necessary to provide broken wire ends in the dummy electrode patterns. Thus, the broken wire ends 211 are designed to appear, for example, at the intersections where the respective leading wires or conductive wires of the touch scanning sub-electrodes and the touch sensing sub-electrodes need to be disconnected from each other (after being disconnected at the intersections, for example, electrical connections may be achieved in another layer via respective bridging electrical connections, such as bridging conductive wires provided across the intersections, and the electrical connections in another layer and electrical connections in the current layer does not affect each other); and, for example, the broken wire ends may also be designed in part of the conductive wires (for example, in the dummy electrode patterns) for the purpose of shadows-elimination and electrical effects (for example, for the purpose of reducing parasitic capacitance(s) described above).

In the relevant art, automatic optical inspection (AOI) is generally used to carry out an inspection on defects of products formed by chip processing, specifically, for example, appearance defects on chips or devices may be inspected based on optical principles (for example, for different processes and materials, with multiple irradiation ways/modes such as regular reflection, diffuse reflection, transmission, coaxial epi-illumination, and UV irradiation). And the inspection on defects comprises: a periodic grayscale comparison method, which is suitable for patterns having certain arrangement rule(s) and period(s), e.g., electrode patterns; and a line width and spacing (or pitch) comparison method, which is generally applicable to patterns that are not periodically arranged, such as terminals of electrodes or leading wires, etc., but not limited thereto. Typical applications are, for example, the inspection on short-circuiting or open-circuiting conditions in electrode patterns.

However, based on AOI, typically, it is often difficult for engineers to determine whether the broken wire ends 211 in the design of the conductive wire are actually disconnected or continuous, respectively.

Specifically, on the one hand, as an example, in the relevant art, for example, a range or size of the field of view of a lens of an industrial vision inspection camera for AOI is, for example, 400 microns, however, the length of the diagonal of each of the first touch sub-electrode 111 in the first touch electrode 11 and the second touch sub-electrode 121 in the second touch sub-electrode 12 (for example, as shown in each of the first direction F1 and the second direction F2) is 4 mm; that is, the period of the first and/or second touch sub-electrodes on the touch display panel (for example, as shown in each of the first direction F1 and the second direction F2) is 4 mm. As such, when the lens of the industrial vision inspection camera is used to capture images of the first touch electrode 11 and the second touch electrode 12 on the touch display panel, respectively, it is not possible to capture an entire view of a single first touch sub-electrode 111 in the first touch electrode 11 and/or an entire view of a single second touch sub-electrode 121 in the second touch electrode 12, within one field of view of the AOI. As a result, the first touch electrode 11 and the second touch electrode 12 lack periodicity in one field of view of the lens of the industrial vision inspection camera. Therefore, the short circuiting and the open circuiting conditions of the conductive wires 21 at the intersections between the first touch electrode 11 and the second touch electrode 12 cannot be determined depending on the periodicity. In particular, for the expected broken wire ends, particularly comprising the broken wire ends between adjacent touch sub-electrodes (for example, between the touch driving sub-electrodes and the touch sensing sub-electrodes adjacent to each other), and the broken wire ends in or near the dummy electrode patterns, due to the lack of periodicity of an observation object in a single field of view, then, it is impossible to effectively set or properly select the period for continuous grayscale acquisition. Therefore, it is not possible to directly use the periodic gray-scale comparison method suitable for detecting patterns having certain arrangement rule(s) and period(s) to determine whether the conductive wires are disconnected (or broken off) indeed at location(s) thereof which would have been provided with the broken wire ends 211 in design, or remain continuous thereat.

On the other hand, in the relevant art, as to a case where, for example, at least one conductive wire in the conductive wire mesh shown in FIG. 1(b) or even FIG. 2 has, for example, broken wire ends in the form of breakpoint shape, since the gaps between the broken wire ends of the conductive wire are relatively small, that is, a gap between adjacent broken wire ends on a conductive wire (that is, the gap where the conductive wire is disconnected) is relatively small, and the line width and line spacing (line gap) are also relatively small, and the line width and line spacing at the broken wire end remain approximately the same as the line width and line spacing of the conductive wire itself. Therefore, the line width and spacing comparison method with AOI fails to achieve an effective identification of the broken wire ends.

Figure 3:
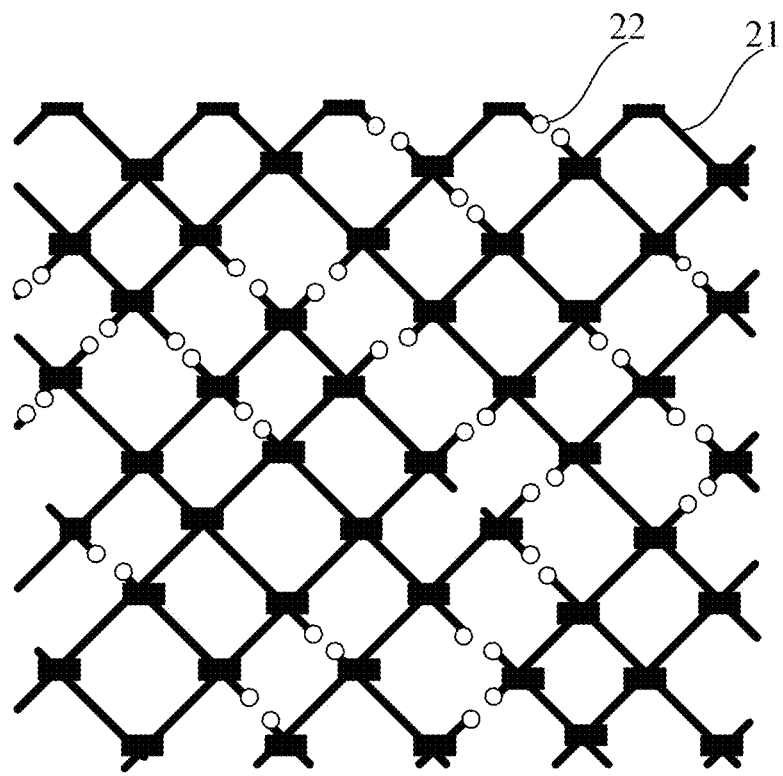
FIG. 3 shows, in a schematic partial enlarged view, a schematic structural view of another type of touch sub-electrodes arranged in a touch display panel as delimited in an ellipse B in FIG. 1(b) and viewed in a field of view of a single AOI, according to an embodiment of the present disclosure.

FIG. 3 shows, in a schematic partial enlarged view, a schematic structural view of another type of touch sub-electrodes arranged in a touch display panel as delimited in an ellipse B in FIG. 1(b) and viewed in a field of view of a single AOI, according to an embodiment of the present disclosure.

Figure 1C:
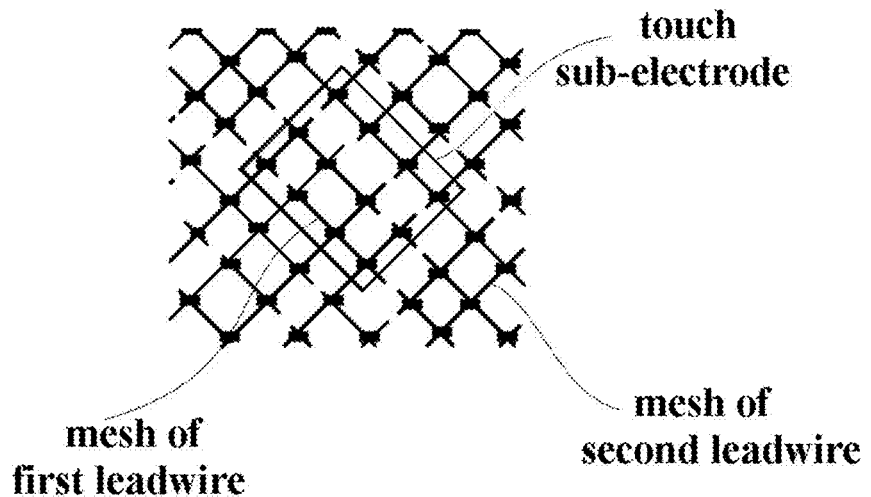
FIG. 1(c) is a schematic view showing respective arrangements of first conductive wires and second conductive wires of a single touch sub-electrode.

According to a general technical concept of the embodiments of the present disclosure, in one aspect of the embodiments of the present disclosure, by way of example, a touch electrode comprises a plurality of touch electrode groups, the plurality of touch electrode groups being arranged to extend linearly along a same extending direction and parallel to one another in a direction orthogonal to the extending direction, and each touch electrode group comprising a plurality of touch sub-electrodes arranged in series along the extending direction; each touch sub-electrode is provided with a plurality of first conductive wires located therein, and a plurality of second conductive wires extending outward from an edge thereof, and respective second conductive wires of the plurality of touch sub-electrodes in each touch electrode group are at least partially connected with one another (by way of example, as illustrated in FIG. 1(c), which shows a schematic diagram of the respective arrangement of the first and second conductive wires of a single touch sub-electrode). At least part of the plurality of first conductive wires and the plurality of second conductive wires are respectively formed with broken wire ends which are provided with respective periods smaller than that of the touch sub-electrodes in each touch electrode group, and broken wire identification portions are formed at or near the broken wire ends, respectively. For example, the broken wire identification portions are configured to identify or indicate the positions of the broken wire ends 211 through specific positioning of the broken wire identification portions, and setting of shapes and sizes of the broken wire identification portions; by way of example, each of the broken wire identification portions is set to have a cross section thereof which has a shape different from a cross sections of each of the first conductive wires or each of the second conductive wires, or is set to have a line width thereof larger than that a line width of each of the first conductive wires or each of the second conductive wires, or positions of the broken wire identification portions are determined to be spaced apart from the broken wire ends. As such, it is convenient to distinguish the broken wire identification portion 22 from respective first conductive wire and second conductive wire, thereby facilitating the engineer to identify the broken wire identification portion.

Specifically, for example, as shown in FIG. 3, taking the first touch electrode 11 as an example, in the case where one first touch sub-electrode 111 in the first touch electrode 11 comprises a broken wire identification portion 22, the broken wire identification portion 22 is configured, for example, to identify specific position of the broken wire end 211, facilitating assisting the engineer to determine defects such as short-circuiting and open-circuiting (i.e., disconnection) of the conductive wire, and the like.

In an embodiment according to the present disclosure, for example, each touch sub-electrode (e.g., each first touch sub-electrode 111, and/or each second touch sub-electrode 121) may comprise a plurality of effective electrode patterns and a plurality of dummy electrode patterns, and the plurality of first conductive wires in each touch sub-electrode (for example, each first touch sub-electrode 111, and/or each second touch sub-electrode 121) comprise effective conductive wire portions arranged in the plurality of effective electrode patterns and dummy conductive wire portions arranged in the plurality of dummy electrode patterns, and respective broken wire identification portions are formed at or near respective broken wire ends of part of the plurality of first conductive wires located in the effective conductive wire portions. As an example, the plurality of dummy electrode patterns are respectively in the form of blocks.

As such, as to the plurality of first touch sub-electrodes 111 in each of the plurality of first touch electrode groups of the first touch electrode 11 and/or the plurality of second touch sub-electrodes 121 in each of the plurality of second touch electrode groups of the second touch electrode 12, since respective second conductive wires, for example, which are located in the effective electrode pattern, have periodically arranged broken wire ends, and the period is for example necessarily less than the period of the first touch sub-electrodes in each first touch electrode group and the period of the second touch sub-electrodes in each second touch electrode group (usually the former (i.e., the period of broken wire ends) is about 1/10 or less of the latter (i.e., period(s) of first and second touch sub-electrodes)). In fact, a period of subdivision (or referred as subdivision period) is inserted into each field of view of AOI, and such period of subdivision is substantially the same order of magnitude as the field of view of AOI. Therefore, in the case of such a setting, a periodic gray-scale comparison method suitable for detecting patterns which have a certain arrangement rule and period may be used; that is, a size of the detection step of the periodic gray-scale comparison method is set depending on the broken wire ends which are designed to appear according to the subdivision period (for example, the broken wire ends which are designed in the effective electrode patterns in each first or second touch sub-electrode), therefore, an AOI which is based on the periodic gray-scale comparison method is used to detect whether disconnections have actually occurred at expected broken wire ends as in design.

In a specific exemplary embodiment, for example, in the periodic gray-scale comparison method, above all, in the case of moving a single detection step in accordance with a set period that is approximately the same order as a designed subdivision period of the broken wire ends, a grayscale image acquisition is performed on the part of the touch sub-electrodes that fall within the field of view of AOI, and then following detection steps are carried out:

Above all, performing a step of periodic gray-scale comparison; in summary, in this step, a periodic gray-scale difference comparison is used to calculate abnormal points. These abnormal points comprise points corresponding to the actual broken wire ends, which need to continue to be screened through calculations later. Specifically, after an image acquisition and a subsequent sampling of the image, a variation curve of the gray scale along a preset direction is obtained; then, from the variation curve of the gray scale, it can be seen that the gray scale of the image is roughly periodically distributed (for example, according to the designed subdivision period of the broken wire ends), but the gray value of some parts of the image is abnormal as compared with expected gray value calculated depending on the periodic distribution rule. Then it is necessary to perform the screening of the actual broken wire ends (for example, actual broken wire ends at the locations of expected broken wire ends) through calculations at a later stage, comprising: threshold screening and defect size screening.

As an example, a screening step follows.

For example, first, the threshold screening step is performed. In summary, in this step, the threshold screening on the abnormal points obtained in the periodic gray-scale comparison step is performed, that is, only abnormal point(s) where the grayscale difference exceeds a certain threshold may be determined as threshold abnormal point(s) detected by the threshold screening, otherwise the abnormal point(s) should be ignored. Specifically, the grayscale difference is defined as, for example, the difference between the actual grayscale value and the expected grayscale value in one subdivision period, or defined to be: in a periodic comparison, the grayscale difference of image in an abnormal grayscale period as compared with other periods. Thereby, the threshold abnormal points are typically divided into two categories: threshold abnormal points where the grayscale differences are positive are referred to as black abnormal points, and threshold abnormal points where the grayscale differences are negative are referred to as white abnormal points. The black abnormal points and/or white abnormal points whose absolute values of the grayscale differences exceed a preset threshold are reserved as threshold abnormal points which are to be screened in subsequent size screening.

And, for example, after the threshold screening, the sizes of the abnormal locations are screened. In summary, in this step, as to the threshold abnormal points detected by the threshold screening, a size screening method by using size inspection is used to qualitatively classify the abnormal locations depending on estimated areas of the abnormal locations. For the abnormal locations whose areas are smaller than a preset area value, they are determined to be normal ones during the screening. After the size screening, the abnormal locations (e.g., the actual broken wire ends that match the designed disconnection points (i.e., designed broken wire ends)) may be determined, and accordingly, points at which the wires are designed to be disconnected but actually remain in connection state can also be determined.

Specifically, in an exemplary embodiment of the present disclosure, FIG. 3 is an enlarged schematic view of the portion (mainly located in the effective electrode patterns) shown in the ellipse B in FIG. 1(b). As shown in FIG. 3, the first touch electrode 11 comprises a plurality of conductive wires 21 and a plurality of broken wire identification portions 22, the plurality of conductive wires 11 are interlaced or intersected to form a conductive wire mesh, and the plurality of conductive wires 21 are electrically connected. As shown in FIG. 3, the conductive wires 21 are provided with some broken wire ends, and the broken wire identification portions 22 provided at or near the broken wire ends are used to mark/indicate the positions of the broken wire ends 211.

Similarly, in the present embodiment, the second touch electrode 12 also comprises, for example, a plurality of conductive wires 21 and a plurality of broken wire identification portions 22, the plurality of conductive wires 11 are interlaced or intersected to form a conductive wire mesh, and the plurality of conductive wires 21 are electrically connected. The conductive wire 21 comprise some broken wire ends 211, and the broken identification portions 22 are configured to identify the positions of the broken wire ends 211.

In the embodiment of the present disclosure, as shown in FIG. 3, for example, at each broken wire end 211 of the first conductive wires or the second conductive wires in the effective electrode patterns (rather than the dummy electrode patterns) of each touch sub-electrode, for example, there may exist a respective one broken wire identification portion 22, respectively.

Figure 4:
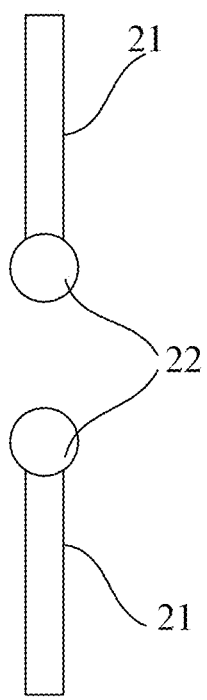
FIG. 4 is a schematic structural view of an arrangement of a broken wire end in another touch sub-electrode according to an embodiment of the present disclosure.

In the embodiment of the present disclosure, for example, as shown in FIG. 4, the broken wire identification portions 22 are located on the extension line of the respective first conductive wire or the respective second conductive wire 21 where the respective broken wire ends are located, and the broken wire identification portions 22 are in contact with the respective first conductive wire or the respective second conductive wire 21 where the respective broken wire ends are located by abutting against the respective broken wire ends. The distance across which the broken wire identification portions 22 span in the width direction of the conductive wire 21 is greater than the width of the conductive wire 21. As such, it is convenient to distinguish the broken wire identification portions 22 from the conductive wire 21, facilitating recognizing the broken wire identification portions by the engineer.

In the embodiment of the present disclosure, the width of the conductive wires 21 is, for example, 3 microns. In addition, the broken wire identification portions 22 are circular, and a diameter of the broken wire identification portions 22 is slightly larger than the line width of the conductive wires 21, for example, is 5 microns.

In another embodiment of the present disclosure, the width of the conductive wire 21 is 3.5 microns, for example. In yet another embodiment, the width of the conductive wire 21 is, for example, 4 microns. To sum up, the width of the conductive wire 21 is, for example, about 3 to 4 microns. The expression "about" means that, at end points of such a width value interval, the conductive wire width value is for example actually equal to or slightly greater than or slightly smaller than the end point value, e.g., the absolute value of the difference between practical end point value and the nominal end point value is 0.1 micrometer.

In another embodiment of the present disclosure, the diameter of the broken wire identification portions 22 is, for example, greater than 5 microns. The expression "about" means that, at this value, the conductive wire width value is actually equal to or slightly larger or slightly smaller than this nominal value, for example, the absolute value of the difference between the practical value and this nominal value is 0.1 micrometer. As such, it may be readily to distinguish the broken wire identification portions from the conductive wire, facilitating recognizing the broken wire identification portions by the engineer.

In the embodiment of the present disclosure, the material of the broken wire identification portions 22 is the same as the material of the conductive wires 21. In this way, it is convenient to prepare the broken wire identification portions and the respective conductive wire(s) through the same process, thus saving the processes.

Similarly, in the embodiment of the present disclosure, the second touch electrode 12 also comprises, for example, a plurality of conductive wires 21 and a plurality broken wire identification portions 22, the plurality of conductive wires 11 are interlaced or intersected to form a conductive wire mesh, and the plurality of conductive wires 21 are electrically connected. The conductive wires 21 comprise broken wire ends 211, and the broken identification portions 22 are used to identify the positions of the broken wire ends 211.

In the embodiment of the present disclosure, in the case where the two broken wire ends 211 are adjacent to each other and located in the extending direction of the same conductive wire 21, there exists one broken wire identification portion 22 at one of the two broken wire ends 211, and there exists no broken wire identification portion 22 at the other broken wire end 211. As such, it is convenient to reduce specific number of broken wire identification portions, thereby saving design costs and material costs.

Figure 5:
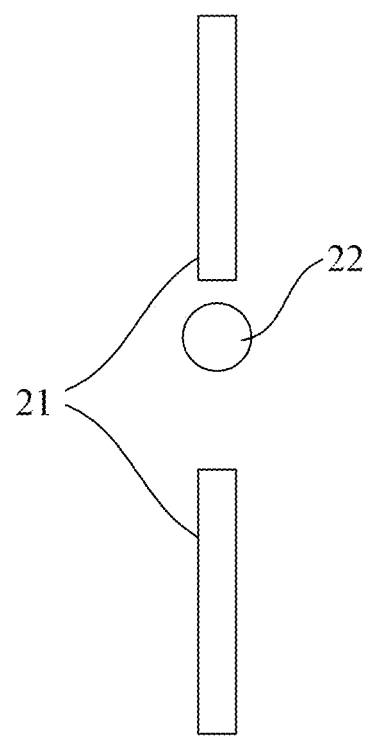
FIG. 5 is a schematic structural view of an arrangement of a broken wire end in still another touch sub-electrode according to an embodiment of the present disclosure.

In the embodiment of the present disclosure, for example, as shown in FIG. 5, the broken wire identification portions 22 are arranged to be separated from the respective first conductive wire or the respective second conductive wire 21 where the respective broken wire ends are located. Specifically, for example, the broken wire identification portions 22 are located between two adjacent broken wire ends of the respective first conductive wire or the respective second conductive wire, and is closer to one of these two broken wire ends.

In the embodiment of the present disclosure, for example, in this embodiment, the broken wire identification portions 22 are located on at least one side of the respective first conductive wire or the respective second conductive wire 21 where the respective broken wire end is located.

Figure 6:
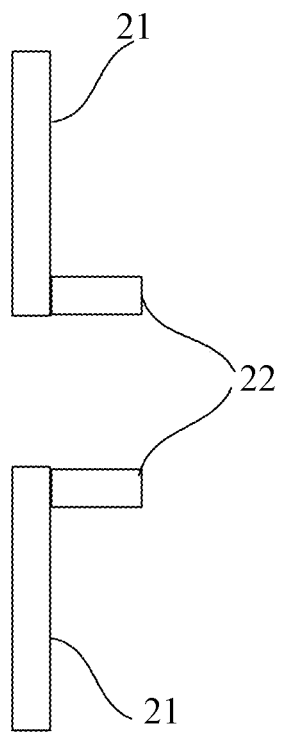
FIG. 6 is a schematic structural view of an arrangement of a broken wire end in yet another touch sub-electrode according to an embodiment of the present disclosure.

More specifically, for example, as shown in FIG. 6, in the case where two broken wire ends 211 are adjacent to each other and located in the extending direction of the same conductive wire 21, the broken wire identification portions 22 of the two broken wire ends 211 may be located on the same side of the conductive wire 21.

Figure 7:
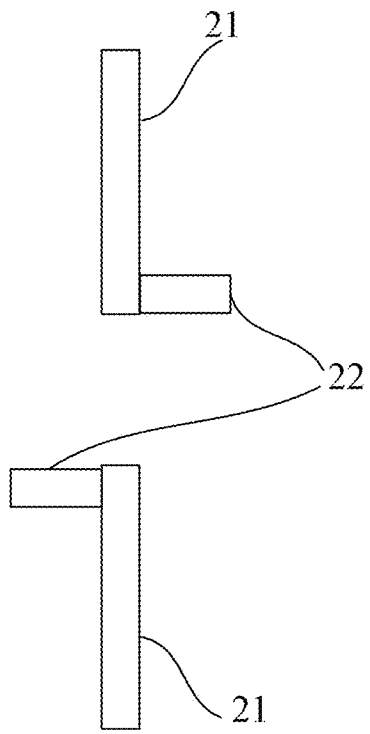
FIG. 7 is a schematic structural view of an arrangement of a broken wire end in further another touch sub-electrode according to an embodiment of the present disclosure.

In addition, more specifically, for example, as shown in FIG. 7, in the case where two broken wire ends 211 are adjacent to each other and located in the extending direction of the same conductive wire 21, the broken wire identification portions are located on two opposite sides of the respective first conductive wire or the second conductive wire where the respective broken wire ends are located. As an example, the broken wire identification portion 22 of one broken wire end 211 may be located on a first side of the conductive wire 21, and the broken wire identification portion 22 of the other broken wire end 211 may be located on a second side of the conductive wire 21, the first side is opposite to the second side.

In the embodiment of the present disclosure, the broken wire identification portions 22 are, for example, rectangular. The distance across which the broken wire identification portions 22 span in the width direction of the conductive wires 21 is, for example, greater than the width of the conductive wires 21, but is not limited thereto, and, for example, is equal to the width of the conductive wires 21.

Of course, the broken wire identification portions are also in the form of a triangle shape, a diamond shape, a pentacle shape, a pentagon shape, or a hexagon shape, for example, but not limited thereto.

Figure 8:
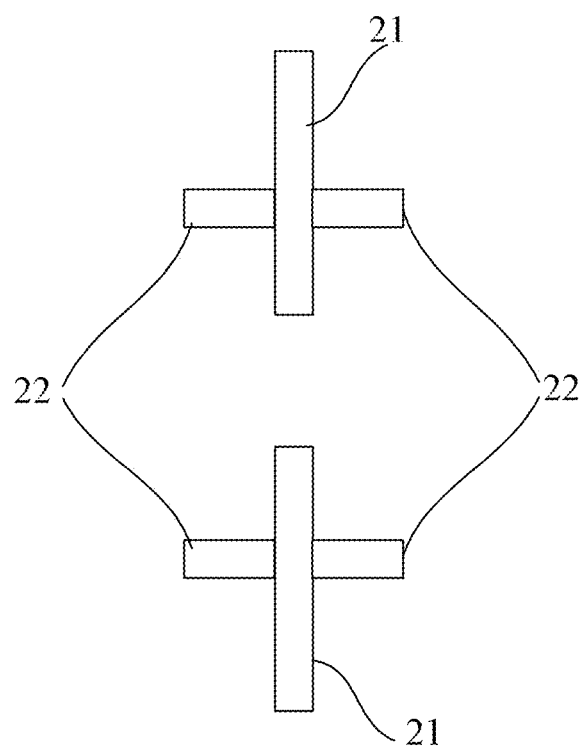
FIG. 8 is a schematic structural view of an arrangement of a broken wire end in still yet another touch sub-electrode according to an embodiment of the present disclosure.

As shown in FIG. 8, in the embodiment of the present disclosure, each of the broken wire identification portions 22 is located on both sides of the conductive wire 21. Specifically, there are two broken wire identification portions 22 at the same broken wire end 211, and each of the two broken wire identification portions 22 is located on both sides of the conductive wire 21.

The touch display panel in the present invention has been briefly introduced above, and the touch display panel in the present invention will be described in detail below.

According to the general technical concept of the embodiments of the present disclosure, in another aspect of the embodiments of the present invention, an exemplary touch display panel is also provided, comprising a display area. The display area further comprises: a first electrode comprising the touch electrode described above, for example, the first touch electrode, which is arranged such that the extending direction of each touch electrode group of each touch electrode group in the first electrode is along a first direction; and a second electrode comprising the touch electrode described above, for example, the second touch electrode, which is arranged such that the extending direction of each touch electrode group in the second electrode is along a second direction orthogonal to the first direction. And the first electrode and the second electrode are alternately arranged along the first direction and the second direction in a manner that orthographic projections of the first electrode and the second electrode on the touch display panel do not overlap with each other. Based on the above embodiment, in this embodiment, the first direction F1 is, for example, a widthwise-edge direction of the touch display panel, the second direction F2 is, for example, a longitudinal-edge direction of the touch display panel, and the first direction F1 and the second directions F2 are perpendicular to each other.

In this embodiment, the first touch electrode 11 is, for example, a transmitting electrode, and the second touch electrode 12 is, for example, a receiving electrode.

In an embodiment of the present invention, there is also provided an exemplary touch display panel. Different from the above-mentioned embodiment, in this embodiment, as shown in FIG. 5, the broken wire identification portion 22 is separated from the conductive wire 21.

In an embodiment of the present invention, there is also provided an exemplary touch display panel. Different from the above-mentioned embodiment, in this embodiment, as shown in FIG. 6, in this embodiment, two broken wire identification portions 22 are located on the same side of the conductive wire 21, each on a single side of the conductive wire 21. Alternatively, as shown in FIG. 7, in this embodiment, two broken wire identification portions 22 are respectively located on different sides of the conductive wire 21, each on a single side of the conductive wire 21.

According to the general technical concept of the embodiments of the present disclosure, in the embodiments of the present invention, there is also provided an exemplary touch display panel. Different from the above-mentioned embodiment, in this embodiment, as shown in FIG. 8, each broken wire identification portion 22 is located on both sides of the conductive wire 21.

In this embodiment, the touch display panel is, for example, an OLED (Organic Light-Emitting Diode) display panel.

In this embodiment, the touch display panel for example further comprises a driving circuit layer, and the driving circuit layer comprises thin film transistors (TFT). The period of the driving circuit layer is 40-100 microns.

In this embodiment, the broken wire identification portions 22 are in contact with the conductive wires 21, and a distance between each broken wire identification portion and a fracture opening of the broken wire end 211 is greater than zero. The fracture opening may for example be prepared by a preparation process, rather than caused by abnormal conductive wire breakage.

In still yet another aspect of the embodiments of the present invention, a touch display device is also provided, comprising the touch display panel described in any of the above embodiments.

It should be noted that the display device in this embodiment may be any product or component having a display function, such as electronic paper, mobile phone, tablet computer, television, laptop computer, digital photo frame, navigator and the like.

As compared with the relevant art, based on the above technical solutions, the touch electrode, the touch display panel and the touch display device according to the embodiments of the present disclosure at least have the following superior technical effects:

In the touch electrode, the touch display panel and the touch display device provided in the embodiments of the present disclosure, by providing broken wire identification portion(s) at or near respective broken wire end(s) for identifying the position(s) of the broken wire end(s), so as to facilitate determination of short circuiting and open circuiting defects and the like of the conductive wire circuits by the engineer when the touch electrodes are being inspected, thereby improving the efficiency of defect detection of the touch electrodes.

It should be noted that in the drawings, sizes of layers and regions may be exaggerated for clarity of illustration. And it may be understood that when an element or layer is referred to as being "on" another element or layer, it may be located directly on the other element, or there may exist an intervening layer therebetween. In addition, it can be understood that when an element or layer is referred to as being "under" another element or layer, it can be located directly under the other element, or there may exist more than one intervening layer or element. In addition, it can also be understood that when a layer or element is referred to as being "between" two layers or two elements, it is, for example, the one and only layer between the two layers or two elements, or there may exist more than one intermediate layer or element therebetween. Similar reference signs indicate similar elements throughout the present disclosure.

In the embodiments of the present disclosure, the terms "first" and "second" are used for description purposes only, and cannot be understood as indicating or implying relative importance or significance. The term "plurality" refers to two or more, unless expressly defined otherwise.

It may readily occur to those skilled in the art other embodiments of the present disclosure after considering the description and practicing the disclosure disclosed herein. The embodiments of the present disclosure are intended to cover any variations, uses, or adaptive changes of the embodiments of the present disclosure, and these variations, uses, or adaptive changes follow the general principles of the embodiments of the present disclosure and comprise the undisclosed common knowledge or common technical means in the technical field which is not disclosed by the embodiments of the present disclosure. The description and embodiments are to be considered as exemplary only, and the true scope and spirit of the embodiments of the present disclosure are pointed out by the following claims.

It should be understood that embodiments of the disclosure are not limited to the precise structures that have been described above and shown in the drawings, and various modifications and changes can be made without departing from the scope thereof. The scope of the embodiments of the present disclosure is merely defined by the appended claims.

What is claimed is:

1. A touch electrode, comprising a plurality of touch electrode groups, the plurality of touch electrode groups being arranged to extend linearly along a same extending direction and parallel to one another in a direction orthogonal to the extending direction, and each touch electrode group comprising a plurality of touch sub-electrodes arranged in series along the extending direction, wherein each touch sub-electrode is provided with a plurality of first conductive wires located therein, and a plurality of second conductive wires extending outward from an edge thereof, and respective second conductive wires of the plurality of touch sub-electrodes in each touch electrode group are at least partially connected with one another;

at least part of the plurality of first conductive wires and the plurality of second conductive wires are respectively formed with broken wire ends which are provided with respective periods smaller than that of the touch sub-electrodes in each touch electrode group, and broken wire identification portions are formed at or near the broken wire ends, respectively, and each of the broken wire identification portions is set to have a cross section thereof which has a shape different from a cross sections of each of the first conductive wires or each of the second conductive wires, or is set to have a line width thereof larger than that a line width of each of the first conductive wires or each of the second conductive wires, or positions of the broken wire identification portions are determined to be spaced apart from the broken wire ends.

2. The touch electrode according to claim 1, wherein each touch sub-electrode comprises a plurality of effective electrode patterns and a plurality of dummy electrode patterns, and the plurality of first conductive wires in each touch sub-electrode comprise effective conductive wire portions arranged in the plurality of effective electrode patterns and dummy conductive wire portions arranged in the plurality of dummy electrode patterns, and respective broken wire identification portions are formed at or near respective broken wire ends of part of the plurality of first conductive wires located in the effective conductive wire portions.

3. The touch electrode according to claim 2, wherein the plurality of effective electrode patterns are connected with one another, and the plurality of dummy electrode patterns are arranged to be surrounded by the plurality of effective electrode patterns and spaced apart from one another, respectively.

4. The touch electrode according to claim 3, wherein the plurality of dummy electrode patterns are respectively in the form of blocks.

5. The touch electrode according to claim 1, wherein at least one broken wire identification portion is located on an extension line of respective at least one first conductive wire or respective at least one second conductive wire where respective at least one broken wire end is located.

6. The touch electrode according to claim 5, wherein at least one broken wire identification portion is in contact with respective at least one first conductive wire or respective at least one second conductive wire where respective at least one broken wire end is located, by abutting against the respective at least one broken wire end, and spans across a distance in a width direction of the respective at least one first conductive wire or the respective at least one second conductive wire, which distance is larger than a width of the respective at least one first conductive wire or the respective at least one second conductive wire.

7. The touch electrode according to claim 1, wherein at least one broken wire identification portion is arranged to be separated from respective at least one first conductive wire or respective at least one second conductive wire where respective at least one broken wire end is located.

8. The touch electrode according to claim 1, wherein at least one broken wire identification portion is located on at least one side of respective at least one first conductive wire or respective at least one second conductive wire where respective at least one broken wire end is located.

9. The touch electrode according to claim 8, wherein, two broken wire ends are adjacent to each other and located in an extending direction of a same conductive wire, each of respective two broken wire identification portions is located on a single side of respective first conductive wire or respective second conductive wire where the two broken wire ends are located respectively, and the respective two broken wire identification portions are respectively located on a same side.

10. The touch electrode according to claim 8, wherein, two broken wire ends are adjacent to each other and located in an extending direction of a same conductive wire, each of respective two broken wire identification portions is located on a single side of respective first conductive wire or respective second conductive wire where the two broken wire ends are located respectively, and the respective two broken wire identification portions are respectively located on different sides.

11. The touch electrode according to claim 8, wherein, two broken wire ends are adjacent to each other and located in an extending direction of a same conductive wire, each of respective two broken wire identification portions is located on both sides of respective first conductive wire or respective second conductive wire where the two broken wire ends are located respectively.

12. The touch electrode according to claim 1, wherein two broken wire ends are adjacent to each other and located in an extending direction of a same conductive wire, one broken wire identification portion is provided at or near one of the two broken wire ends.

13. The touch electrode according to claim 1, wherein each of the broken wire identification portions is shaped in the form of a circle shape, a triangle shape, a rectangle shape, a diamond shape, a pentacle shape, a pentagon shape, or a hexagon shape.

14. The touch electrode according to claim 1, wherein a width of each of the first and second conductive wires is about 3 microns to 4 microns; and each of the broken wire identification portions is shaped in the form of a circle, and a diameter of each of the broken wire identification portions is greater than or equal to about 5 microns.

15. The touch electrode according to claim 1, wherein a material of the broken wire identification portions is the same as a material of the first conductive wires and the second conductive wires.

16. The touch electrode according to claim 1, wherein each touch sub-electrode is in the form of a quadrangular shape; and a length of a diagonal line of each touch sub-electrode is about 4 mm to 5 mm.

17. A touch display panel comprises a display area, wherein the display area comprises:

a first electrode comprising the touch electrode according to claim 1, arranged such that the extending direction of each touch electrode group in the first electrode is along a first direction;

a second electrode comprising the touch electrode according to claim 1, arranged such that the extending direction of each touch electrode group in the second electrode is along a second direction orthogonal to the first direction, wherein the first electrode and the second electrode are alternately arranged along the first direction and the second direction in a manner that orthographic projections of the first electrode and the second electrode on the touch display panel do not overlap with each other.

18. A touch display device, comprising the touch display panel according to claim 17.

\* \* \* \* \*